United States Patent
Bendlin et al.

(10) Patent No.: US 11,490,404 B2
(45) Date of Patent: Nov. 1, 2022

(54) DEMODULATION REFERENCE SIGNAL PATTERNS FOR DYNAMIC SPECTRUM SHARING WITH INCREASED SPECTRAL EFFICIENCY FOR 5G OR OTHER NEXT GENERATION NETWORK

(71) Applicant: AT&T Intellectual Property I, L.P., Atlanta, GA (US)

(72) Inventors: Ralf Bendlin, Cedar Park, TX (US); SaiRamesh Nammi, Kista (SE); Arunabha Ghosh, Austin, TX (US); Xiaoyi Wang, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 307 days.

(21) Appl. No.: 16/549,022

(22) Filed: Aug. 23, 2019

(65) Prior Publication Data
US 2021/0058953 A1  Feb. 25, 2021

(51) Int. Cl.
| | | |
|---|---|---|
| *H04W 72/12* | (2009.01) | |
| *H04L 5/00* | (2006.01) | |
| *H04L 1/00* | (2006.01) | |
| *H04W 16/14* | (2009.01) | |

(52) U.S. Cl.
CPC ....... *H04W 72/1273* (2013.01); *H04L 1/0013* (2013.01); *H04L 5/0051* (2013.01); *H04W 16/14* (2013.01)

(58) Field of Classification Search
CPC ... H04L 1/0013; H04L 1/0067; H04L 5/0051; H04L 5/0094; H04W 16/14; H04W 72/1273
See application file for complete search history.

(56) References Cited

U.S. PATENT DOCUMENTS

| | | | | |
|---|---|---|---|---|
| 2019/0149365 A1* | 5/2019 | Chatterjee | ............. | H04L 5/0044 370/329 |
| 2020/0382354 A1* | 12/2020 | Sengupta | ............. | H04L 5/0048 |
| 2021/0152310 A1* | 5/2021 | Baldemair | ............ | H04L 5/0051 |

* cited by examiner

*Primary Examiner* — Saad A. Waqas
(74) *Attorney, Agent, or Firm* — Amin, Turocy & Watson, LLP

(57) ABSTRACT

The disclosed subject matter is directed towards semi-static or dynamic shifting of New Radio demodulation reference signals to avoid collisions with LTE cell specific reference signals (LTE CRS) in a physical downlink shared channel symbol (PDSCH). In dynamic spread spectrum (DSS) deployments, where NR PDSCH mapping type B is used, e.g., to allow for two NR physical downlink control channel symbols, when the NR PDSCH starts on a symbol carrying LTE CRS, the NR DMRS of the NR PDSCH is shifted to the first symbol of the NR PDSCH not carrying LTE CRS. Whether mapping type A or mapping type B, shifting the symbol containing NR DMRS facilitates the use of two DMRS symbols without colliding with LTE CRS.

20 Claims, 12 Drawing Sheets

DEMODULATION REFERENCE SIGNAL PATTERNS FOR DYNAMIC SPECTRUM SHARING WITH INCREASED SPECTRAL EFFICIENCY FOR 5G OR OTHER NEXT GENERATION NETWORK

TECHNICAL FIELD

The subject application relates to wireless communications systems in general, and more particularly to New Radio (NR) including fifth generation (5G) cellular wireless communications systems and/or other next generation networks, in which Dynamic Spectrum Sharing (DSS) (also referred to as Long Term Evolution (LTE) LTE-NR coexistence, or LNC), allows for deployment in overlapping spectrum.

BACKGROUND

When 4G LTE (Fourth Generation Long Term Evolution) and 5G NR (Fifth Generation New Radio) are deployed in partially or fully overlapping spectrum, NR signals and channels are mapped to the Orthogonal Frequency-Division Multiplexing (OFDM) time-frequency resource grid such that collisions with LTE signals and channels do not occur. In one alternative, NR signals are configured such that they never overlap with LTE channels and signals. Alternatively, NR channels can dynamically be rate matched or punctured around Resource Elements (REs) occupied by LTE.

If a NR transmission, for example a Physical Downlink Shared Channel (PDSCH), is scheduled in a normal downlink subframe, and one or more LTE Cell Specific Reference Signals (CRS) punctures the PDSCH, the resource elements carrying LTE CRS are not used for NR PDSCH. Rather, the transmitter sends the actual LTE CRS on these resources. If a NR receiver is made aware of the LTE-CRS configuration, the NR transmitter can map (and the NR receiver, aware of the LTE CRS configuration, can demap) the NR PDSCH around resources reserved for LTE-CRS. This is referred to as rate matching, because removing the resource elements for LTE-CRS from the NR PDSCH transmission changes the code rate, which is now matched to take into account the LTE-CRS transmission.

In PDSCH mapping type A, the first symbol carrying demodulation reference signals (DMRS) for demodulating the NR PDSCH is transmitted on a fixed symbol informed to the UE by the MasterInformationBlock (MIB) payload transmitted in the Physical Broadcast Channel (PBCH). For PDSCH mapping type A, the DMRS can be configured to be transmitted on either the third or fourth OFDM symbol, depending on the number of LTE CRS antenna ports and the NR PDCCH (physical downlink control channel) span, that is, the number of OFDM symbols carrying NR PDCCH. Alternatively, PDSCH mapping type B can be used for NR PDSCH transmissions. PDSCH mapping type A and B differ in that unlike with PDSCH mapping type A, where the position of the PDSCH DMRS is fixed and signaled in the MIB, with PDSCH mapping type B the PDSCH DMRS position is always the first symbol of the actual NR PDSCH transmission.

Because NR PDCCH occupies the symbols between two consecutive symbols carrying LTE CRS (third and fourth OFDM symbol) and because NR DMRS cannot collide with LTE CRS, using two NR PDCCH control symbols in LNC/DSS with PDSCH mapping type B accordingly means leaving the fifth symbol empty (other than for the LTE-CRS), which is inefficient. This does not happen with NR PDSCH mapping type A where all but the first two symbols are used for NR transmissions. However, the drawback of using PDSCH mapping type A is that at most one symbol can be used for NR PDCCH because PDSCH mapping type A cannot be scheduled with a PDCCH after the third symbol. Limiting the NR PDCCH to one symbol is extremely challenging when the bandwidth of the NR carrier matches that of the LTE carrier and is only 5 or 10 MHz, whereby at most Aggregation Level (AL) 8 can be used for NR PDCCH, which can adversely impact NR PDCCH robustness and coverage. Moreover, multiplexing multiple NR PDCCH into one symbol is very challenging given the limited overall NR PDCCH control resources. Hence, deployments that allow for up to two NR PDCCH symbols (twice the capacity as compared to one symbol) are advantageous. Such deployments, however, need to use PDSCH mapping type B, as PDSCH mapping type A has to be scheduled from the first three symbols.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
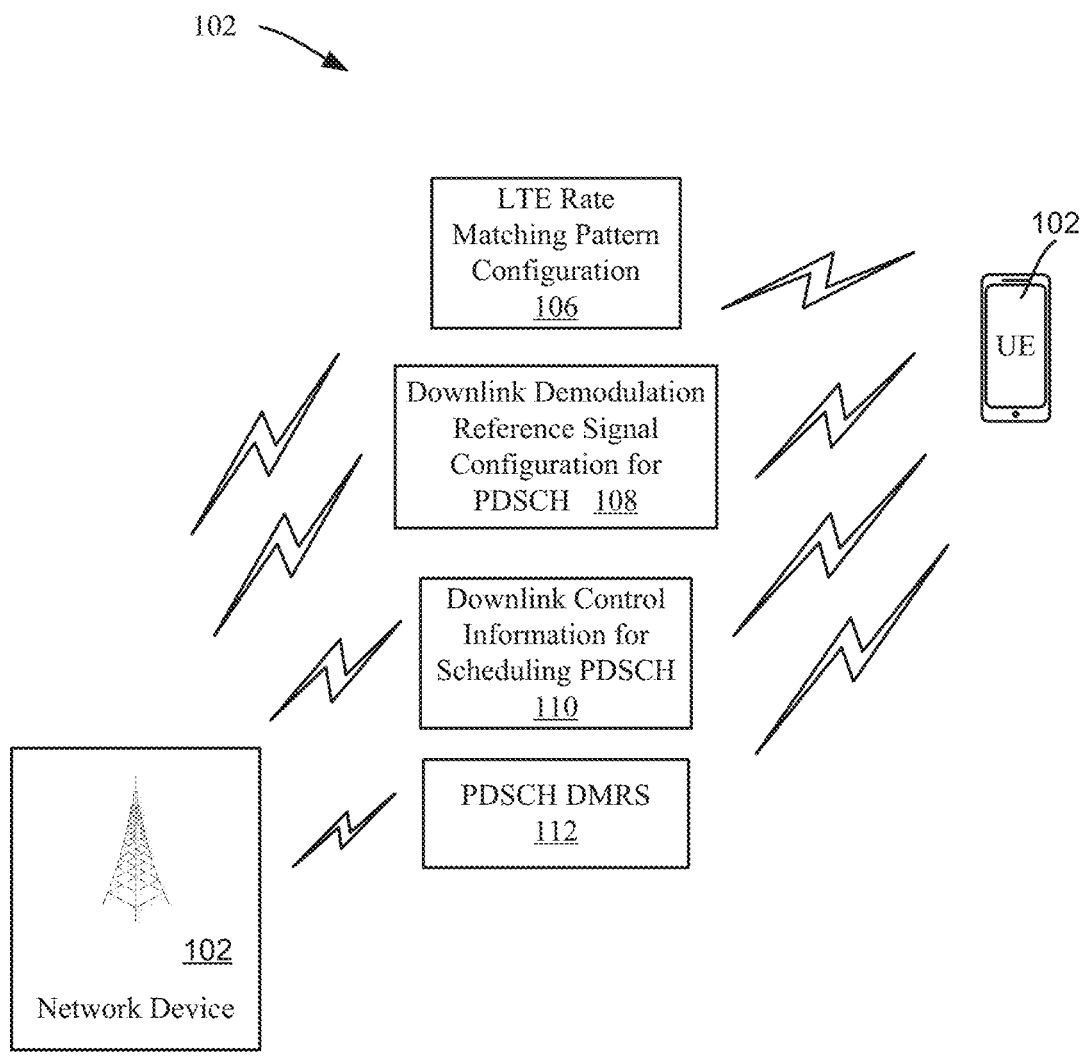
FIG. 1 illustrates an example wireless communication system showing communications from a network device to a user equipment, in accordance with various aspects and embodiments of the subject disclosure.

The technology described herein is generally directed towards avoiding collisions between LTE CRS (cell specific reference signals) and DMRS (demodulation reference signals) in LNC/DSS (LTE-NR coexistence/Dynamic Spectrum Sharing) deployments, by shifting the DMRS to a later (later in symbol order) PDSCH (physical downlink shared channel) OFDM symbol when LTE-CRS is present in a PDSCH symbol. Among other benefits, this allows a PDSCH symbol containing LTE-CRS to include NR downlink data in the LTE-CRS symbol's subcarriers (other than those containing LTE-CRS), rather than leaving the symbol otherwise empty, including when two symbols are used for physical downlink control channel (PDCCH) data in mapping type B.

In general, to avoid a LTE-CRS and DMRS collision when such a collision could occur based on the rate matching pattern, the base station device shifts the DMRS to a later symbol. Based on the LTE-CRS rate matching configuration information sent to a user equipment, the user equipment recognizes when a LTE-CRS and DMRS collision would have otherwise occurred, and thereby knows that the DMRS have been shifted to another (e.g., next) PDSCH symbol.

Where NR PDSCH mapping type B is used, e.g., to allow for two NR PDCCH symbols, and when the NR PDSCH starts on a symbol carrying LTE CRS, the NR DMRS of the NR PDSCH is shifted to the first symbol of the NR PDSCH not carrying LTE CRS in order to avoid a collision of LTE CRS with NR DMRS. The same procedure may be applied to NR DMRS that is not configured at the beginning of an NR PDSCH allocation. When NR DMRS that are not at the beginning of the corresponding NR PDSCH allocation would otherwise collide with LTE CRS, the NR DMRS can be shifted to avoid such a collision.

The technology thus allows using up to all NR OFDM symbols (except the first two of a slot) when NR PDCCH is transmitted outside the first three OFDM symbols of a slot using NR PDSCH mapping type B, whereby NR DMRS is not sent on the first OFDM symbol of the NR PDSCH resource allocation containing LTE CRS and furthermore, sending NR DMRS on the second OFDM symbol of the NR PDSCH resource allocation. Further, regardless of whether a NR PDSCH resource allocation is of PDSCH mapping type A or B, two consecutive OFDM symbols may be configured to carry NR DMRS. Again, when LTE CRS may collide with NR DMRS on the second of the two symbols carrying NR DMRS, shifting of the DMRS is performed to avoid the collision.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in FIG. 1, a network device 102 such as base station configures a user equipment 104 for downlink communications. As described herein, for dynamic spectrum sharing, the network device 102 transmits LTE rate matching pattern configuration information 106 to the UE 104. As further described herein, the network device 102 transmits downlink DMRS configuration information 108, control channel information 110 and the PDSCH symbols, including at least one PDSCH symbol 104 that carries the DMRS 112.

More particularly, in order for the user equipment (NR receiver) to be able to rate match around the LTE CRS resources, the LTE CRS configuration is provide, which can be done via the Radio Resource Control (RRC) protocol which contains the RateMatchPatternLTE-CRS Information Element (IE) informing the NR receiver about the LTE carrier frequency, carrier bandwidth, Multimedia Broadcast multicast service Single Frequency Network (MBSFN) subframe configuration, number of LTE CRS antenna ports and v-shift (described below). Note that different cell-specific reference signal (CRS) patterns can be provided for one, two, and four LTE CRS antenna ports. These LTE reference signals are present in LTE subframes (set of 14 OFDM symbols spanning 1 ms for 15 kHz OFDM subcarrier spacing), with different densities depending on whether an LTE subframe is configured as normal downlink or MBSFN subframe.

The LTE carrier frequency and bandwidth are informed to the NR UE in case LTE and NR carriers are partially, rather than fully overlapping. Knowledge of the MBSFN subframe configuration is needed because, as mentioned above, the LTE CRS density differs between normal and MBSFN subframes and hence, the rate matching procedure has to account for different LTE CRS patterns depending on whether the NR PDSCH is transmitted in a normal or a MBSFN subframe.

Because the LTE CRS density also differs for {1,2,4} LTE CRS antenna ports, this information is conveyed to the NR UE together with information on the v-shift which allows to shift the patterns by zero, one or two subcarriers in frequency domain to avoid collisions of LTE CRS transmissions by neighboring base stations.

In one known solution, LTE or DSS can be deployed using one of two configurations. In a first configuration, for four LTE CRS antenna ports, the NR Physical Downlink Control Channel (PDCCH) is transmitted on the third OFDM symbol, and on the second and third symbol for one or two LTE CRS antenna ports. The NR PDSCH, in this configuration, is transmitted using PDSCH mapping type A whereby the first symbol carrying DMRS for demodulating the NR PDSCH is transmitted on a fixed symbol informed to the UE by the MasterinformationBlock (MIB) payload transmitted in the Physical Broadcast Channel (PBCH). For PDSCH mapping type A, the DMRS can be configured to either be transmitted on the third or fourth OFDM symbol depending on the number of LTE CRS antenna ports and the NR PDCCH span, i.e., the number of OFDM symbols carrying NR PDCCH.

In one configuration, the first two OFDM symbols are reserved for LTE CRS (NR PDCCH transmissions cannot be rate matched around LTE CRS). The third OFDM symbol carries the control information NR PDCCH (without special UE support, the NR PDCCH can span at most three symbols at the beginning of a subframe/slot); because the third symbol carriers NR PDCCH, the DMRS is configured to be transmitted on the fourth symbol. NR PDSCH uses resources starting with the fourth symbol (carrying the DMRS) until the end of the subframe/slot. (A NR slot comprises 14 OFDM symbols and a NR subframe is fixed to 1 ms duration. At 15 kHz subcarrier spacing, the same subcarrier spacing as for LTE, the duration of a NR slot coincides with that of a subframe.)

Alternatively, PDSCH mapping type B can be used for NR PDSCH transmissions. PDSCH mapping type A and B differ in that unlike with PDSCH mapping type A, where the position of the PDSCH DMRS is fixed and signaled in the MIB, with PDSCH mapping type B the PDSCH DMRS position is always the first symbol of the actual NR PDSCH transmission. In one known solution, the first two OFDM symbols are reserved for LTE CRS, the third and fourth OFDM symbol carry NR PDCCH, and the fifth symbol is reserved because LTE CRS and DMRS are not allowed to collide by 5G NR specifications. Thus, the NR PDSCH starts on the sixth symbol, which carries the corresponding DMRS Because the PDSCH can be scheduled to start on any OFDM symbol with PDSCH mapping type B, the corresponding DMRS can be on any symbol because according to NR specifications, for PDSCH mapping type B the DMRS is carried on the first symbol of the actual NR PDSCH. It is noted that additional OFDM symbols can be configured for DMRS, e.g., to improve performance in high-speed scenarios.

It is also noted that the PDCCH configuration for mapping type B requires special UE support, in that basic NR UEs only support a PDCCH span of up to three OFDM symbols at the beginning of a slot. In other words, NR PDCCH can be transmitted on any or all of the first three OFDM symbols, but no PDCCH resources can span beyond the third OFDM symbol, e.g., the fourth OFDM symbol.

However, as an optional UE capability, the NR PDCCH span of up to three OFDM symbols can be shifted to the right to not commence at the slot boundary allowing NR PDCCH transmissions on any or all OFDM symbols of a single span of three OFDM symbols anywhere in a slot. For LNC/DSS, this allows to shift NR PDCCH resources to commence after the LTE CRS at the beginning of a slot, e.g., after the first symbol for one or two LTE CRS antenna ports and after the second symbol for four LTE CRS antenna ports, such as where the NR PDCCH span starts on the third symbol and goes beyond the third symbol including the fourth symbol thereby mapping the NR PDCCH on all symbols not carrying LTE CRS between two consecutive symbols carrying LTE CRS. Because NR PDSCH mapping type A cannot be scheduled using a PDCCH that occupies resources after the third symbol, such a configuration requires usage of PDSCH mapping type B.

Thus, in known solutions, because LTE CRS and NR DMRS are not allowed to collide, the fifth OFDM symbol has to be left empty. This does not happen with NR PDSCH mapping type A where all but the first two symbols are used for NR transmissions, however at most one symbol can be used for NR PDCCH because PDSCH mapping type A cannot be scheduled with a PDCCH after the third symbol.

In contrast to the known solutions, the technology described herein facilitates using two NR PDCCH control symbols in LNC/DSS with PDSCH mapping type B, without leaving the fifth symbol empty (for use with LTE-CRS). The technology described herein allows mapping NR PDSCH onto the fifth symbol whereby the fifth symbol is the first symbol of a NR PDSCH according to PDSCH mapping type B. To this end, in LNC/DSS deployments, where NR PDSCH mapping type B is used, e.g., to allow for two NR PDCCH symbols, and when the NR PDSCH starts on a symbol carrying LTE CRS, the NR DMRS of said NR PDSCH is shifted (e.g., to the first symbol of the NR PDSCH not carrying LTE CRS) in order to avoid collision of LTE CRS with NR DMRS. In addition, the same procedure may be applied to NR DMRS that is not configured at the beginning of an NR PDSCH allocation. When NR DMRS not at the beginning of the corresponding NR PDSCH allocation would otherwise collide with LTE CRS, the NR DMRS can be shifted to avoid such a collision.

The technology described herein thus allows the use of up to all NR OFDM symbols (except the first two of a slot) when NR PDCCH is transmitted outside the first three OFDM symbols of a slot using NR PDSCH mapping type B whereby NR DMRS is not sent on the first OFDM symbol of the NR PDSCH resource allocation containing LTE CRS and furthermore, sending NR DMRS on the second OFDM symbol of the NR PDSCH resource allocation. Further, with mapping type A, multiple PDSCH symbols with DMRS can be used without LTE-CRS collisions.

Figure 2:
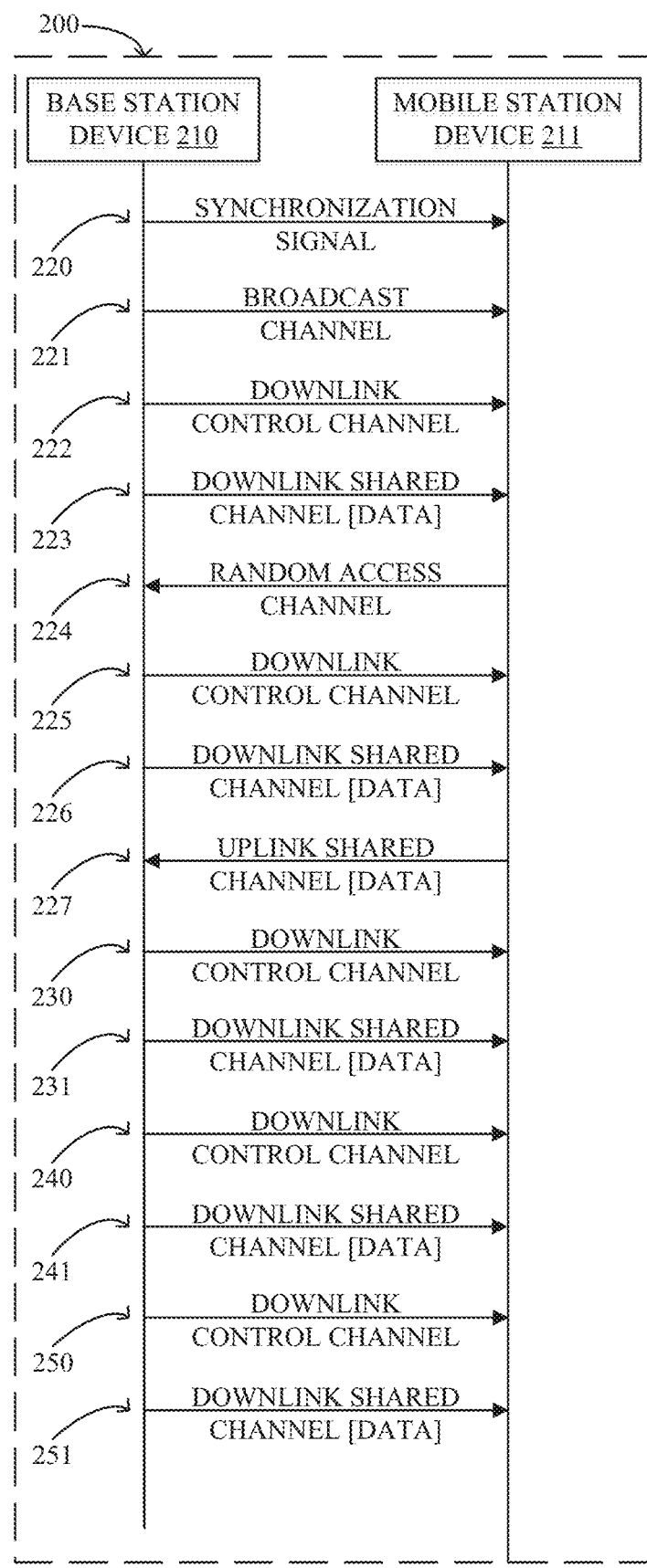
FIG. 2 illustrates an example timing diagram showing communications between a base station and a mobile station device, in accordance with various aspects and embodiments of the subject disclosure.

FIG. 2 depicts communications in an exemplary wireless communications system 200, which can be the same as or similar to the system 100 of FIG. 1. Mobile station device 211 first receives synchronization signal information 220 from base station device 210 to obtain coarse time and frequency synchronization for reception of the broadcast channel 221 transmitted by base station device 210. The payload of the broadcast channel transmission 221 enables mobile station device 211 to receive remaining system information (RMSI) scheduled by physical downlink control channel (PDCCH) transmission 222 and transmitted by the physical downlink shared channel (PDSCH) transmission 223. The payload of 223, namely, parts of the RMSI, enable mobile station device 211 to initiate a random access procedure by transmitting a physical random access channel transmission 224 to base station device 210. Base station device 210 responds to the physical random access channel transmission 224 with a random access response (RAR) scheduled by physical downlink control channel (PDCCH) transmission 225 and transmitted by the physical downlink shared channel (PDSCH) transmission 226. Amongst others, the random access response includes information for mobile station device 211 to transmit message 3 (Msg.3) on the physical uplink shared channel (PUSCH) transmission 227. Physical downlink shared channel (PDSCH) transmission 231 scheduled by physical downlink control channel (PDCCH) transmission 230 may serve the purpose of contention resolution, if necessary. After contention resolution, one or more PDCCH 240 and PDSCH 241 transmissions may configure the mobile station device 211 for LNC/DSS. Subsequently, PDSCH transmissions 251 scheduled by PDCCH transmissions 250 use the embodiments herein.

For ease of exposition, but without limiting any embodiments, FIGS. 3-6 depict LTE DL subframes with the highest LTE CRS density. Note that in FIGS. 3-6, an unshaded, unlabeled block indicates zero-power resource, a shaded block labeled L represents LTE-CRS, an unshaded block labeled C represents control channel information (NR-PDCCH), a hatched block labeled D represents NR PDSCH DMRS, and an unshaded block labeled S represents NR-PDSCH containing downlink data in general.

In one embodiment, the mobile station device 111 can be semi-statically configured by RRC to always transmit DMRS on the second symbol of a NR PDSCH with PDSCH mapping type B. As a result, the first NR PDSCH symbol (the fifth symbol/column in FIG. 3) is able to contain the LTE-CRS, with no possible collision, (as the sixth symbol in FIG. 3 contains the DMRS as a result of the semi-static configuration).

In another embodiment of the technology described herein, the mobile station device 111 dynamically switches the DMRS position for PDSCH mapping type B depending on whether the first symbol of the NR PDSCH resource allocation contains LTE CRS. As described herein, the NR UE is aware of the LTE CRS rate matching configuration via the RateMatchPatternLTE-CRS information element of the NR RRC protocol. The NR PDCCH dynamically allocates NR PDSCH resources with PDSCH mapping type B to the UE. The Downlink Control Information (DCI) in the PDCCH together with the LTE CRS rate matching configuration, e.g., RateMatchPatternLTE-CRS of the RRC protocol, is used by the NR receiver to determine whether the first symbol of the NR PDSCH resource allocation contains LTE CRS.

Figure 3:
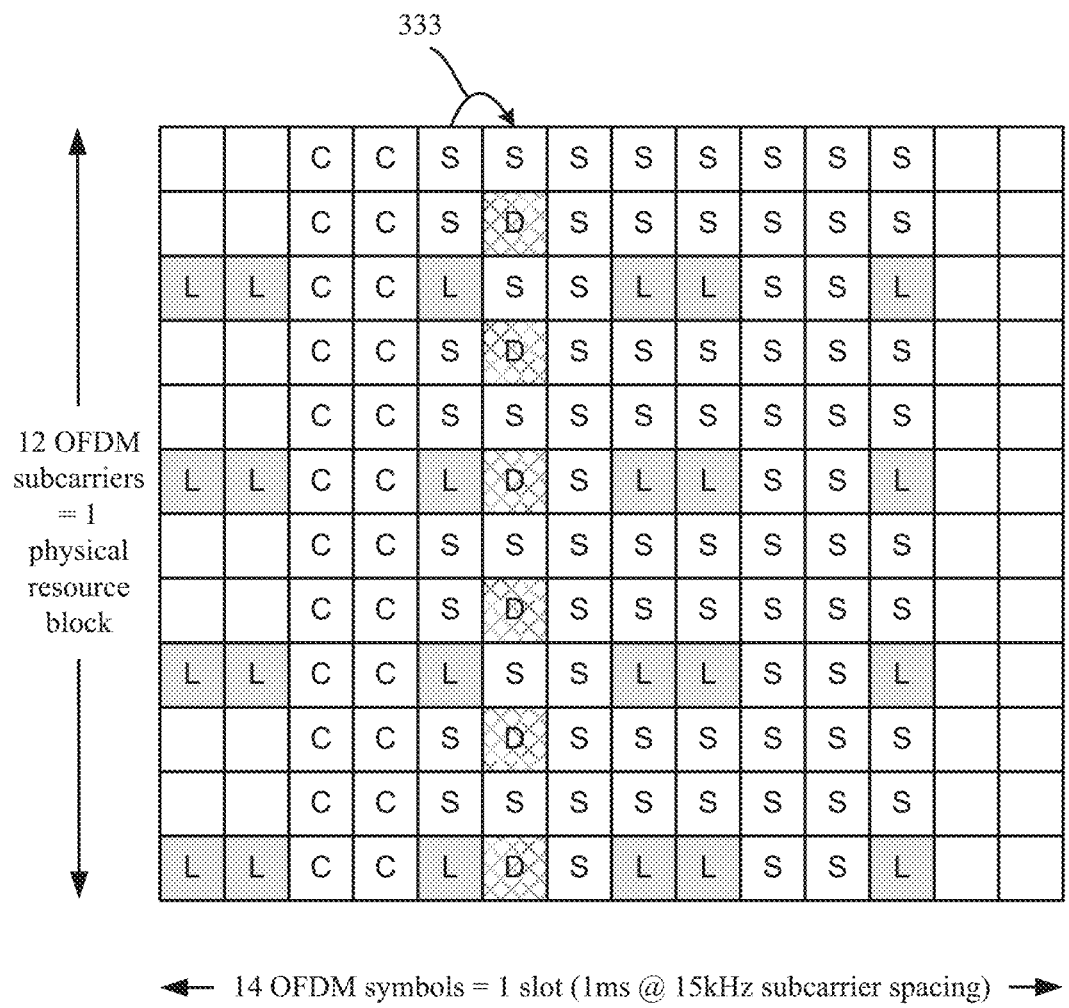
FIG. 3 is an example representation of OFDM symbols in which demodulation reference signals in a PDSCH symbol can be configured to or dynamically shifted to avoid collision with LTE cell-specific reference signals, in accordance with various aspects and embodiments of the subject disclosure.
Figure 4:
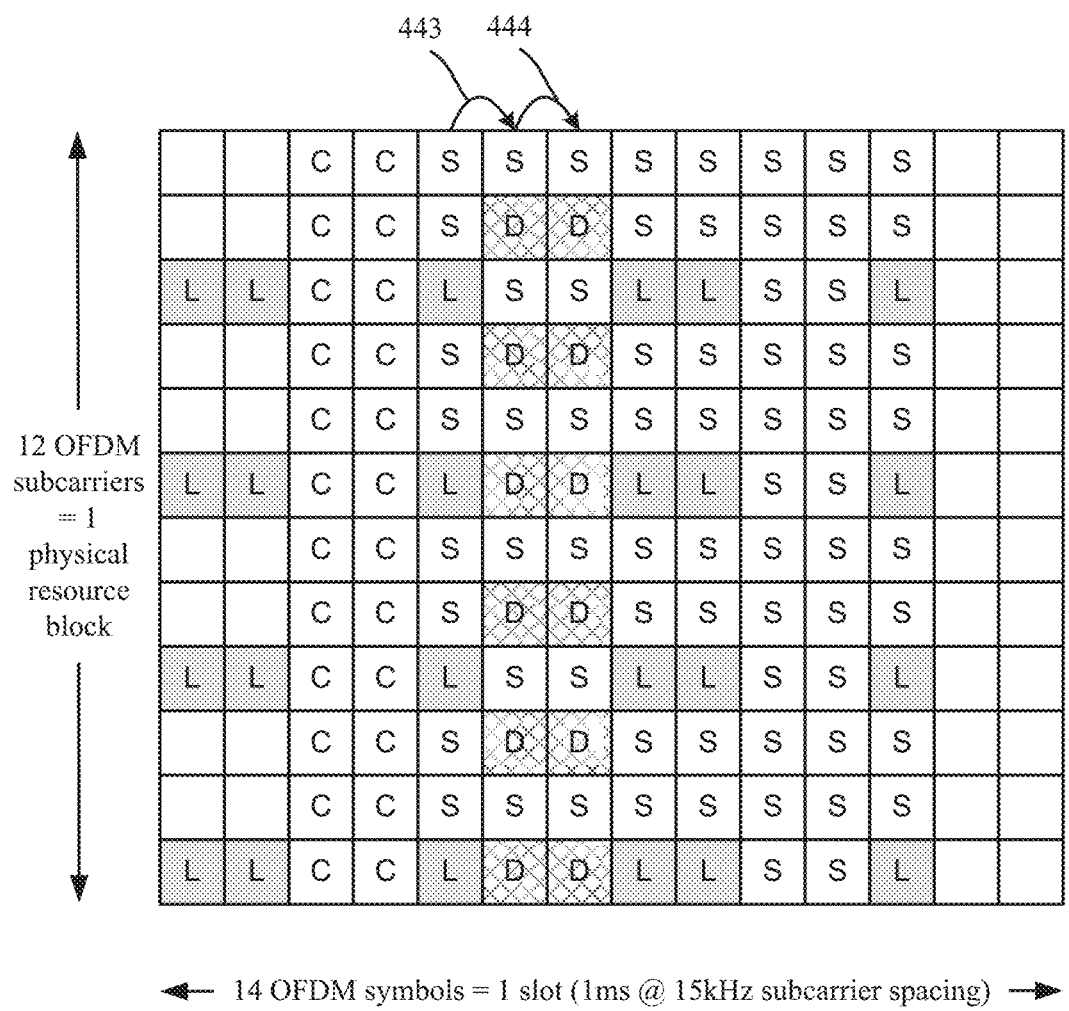
FIG. 4 is an example representation of OFDM symbols in which two consecutive demodulation reference signals in PDSCH symbols are dynamically shifted to avoid collision with LTE cell-specific reference signals, in accordance with various aspects and embodiments of the subject disclosure.

If the first symbol of the NR PDSCH resource allocation does not contain LTE CRS, NR DMRS is transmitted on the first symbol, according to prior solutions. If instead the first symbol of the NR PDSCH resource allocation does contain LTE CRS, the NR DMRS is dynamically shifted to the second OFDM symbol as exemplified by the curved arrow labeled 333 in FIG. 3. Note that FIG. 3 represents both the semi-static configuration and a dynamically shifted configuration; the dynamic shift embodiment is emphasized by the curved arrow 333.

Note that a DMRS configuration may comprise NR DMRS on more than one consecutive OFDM symbol. For example, NR DMRS may be configured on the first two OFDM symbols of a NR PDSCH resource allocation of PDSCH mapping type B. In this case, if the UE determines that LTE CRS is transmitted on the first symbol of the NR PDSCH resource allocation of PDSCH mapping type B as in FIG. 4, both symbols carrying NR DMRS are shifted. For example, if as in FIG. 4 the NR DMRS that normally is transmitted on the first symbol of the NR PDSCH resource allocation of PDSCH mapping type B is shifted (curved arrow 443) to the second symbol of the NR PDSCH resource allocation of PDSCH mapping type B and the NR DMRS that normally is transmitted on the second symbol of the NR PDSCH resource allocation of PDSCH mapping type B is shifted (curved arrow 444) to the third symbol of the NR PDSCH resource allocation of PDSCH mapping type B.

Figure 5:
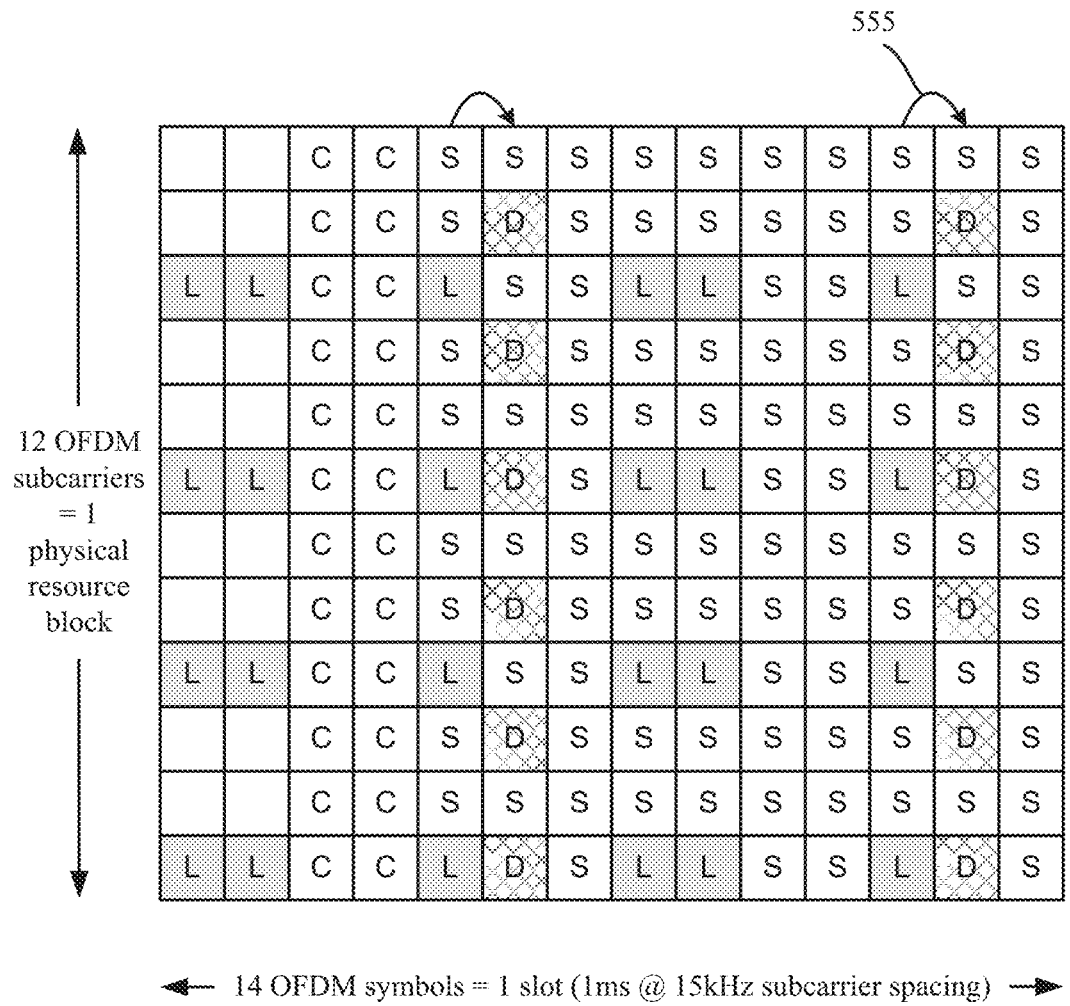
FIG. 5 is an example representation of OFDM symbols in which two separate demodulation reference signals in a PDSCH symbols are dynamically shifted to avoid collision with LTE cell-specific reference signals, in accordance with various aspects and embodiments of the subject disclosure.

Aspects of the embodiments herein may also be applied to NR DMRS symbols that are not at the beginning of a slot, as illustrated in the example of FIG. 5. In this example, NR DMRS is also configured to be transmitted on the eighth symbol of a NR PDSCH resource allocation of PDSCH mapping type B. If, however, the DCI scheduling the NR PDSCH in conjunction with the LTE CRS rate matching information determine that the eighth symbol of a NR PDSCH resource allocation contains LTE CRS, the NR DMRS is dynamically shifted (curved arrow 555) to the ninth symbol.

In yet another embodiment of the technology described herein, regardless of whether a NR PDSCH resource allocation is of PDSCH mapping type A or B, two consecutive OFDM symbols may be configured to carry NR DMRS. For example, the fourth and fifth OFDM symbol of a slot may be configured for NR DMRS transmissions when PDSCH mapping type A is used, or the first two symbols of a NR PDSCH resource allocation of PDSCH mapping type B may be configured for NR DMRS transmissions. In either case, LTE CRS could collide with NR DMRS on the second of the two symbols carrying NR DMRS. In such a situation, the first of the two OFDM symbols with NR DMRS remains unchanged, and the NR DMRS that otherwise would have been transmitted on the second OFDM symbol with NR DMRS (e.g., the fifth OFDM symbol of a slot when PDSCH mapping type A is used, or the second OFDM symbol of a NR PDSCH resource allocation of PDSCH mapping type B) is shifted by one OFDM symbol to avoid collision with LTE CRS.

Figure 6:
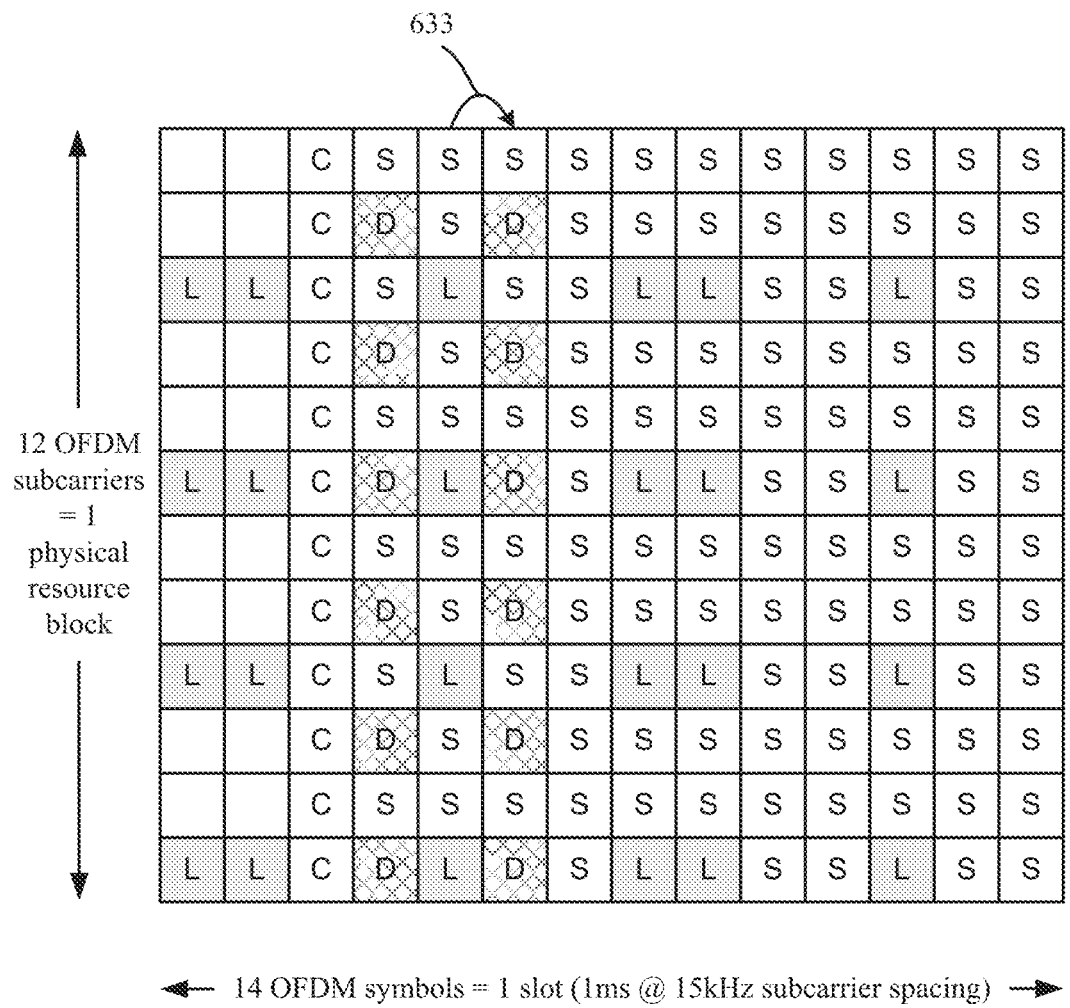
FIG. 6 is an example representation of OFDM symbols in which a second group of demodulation reference signals in a PDSCH symbol is dynamically shifted to avoid collision with LTE cell-specific reference signals, in accordance with various aspects and embodiments of the subject disclosure.

An example illustration of this embodiment for PDSCH mapping type A is shown in FIG. 6. As can be seen, via the shift (arrow 633), NR DMRS is carried, for example, on the fourth and sixth OFDM symbol of a slot. Note that for PDSCH mapping type B, NR DMRS is carried on the first and third OFDM symbol of the corresponding NR PDSCH resource allocation.

Figure 7:
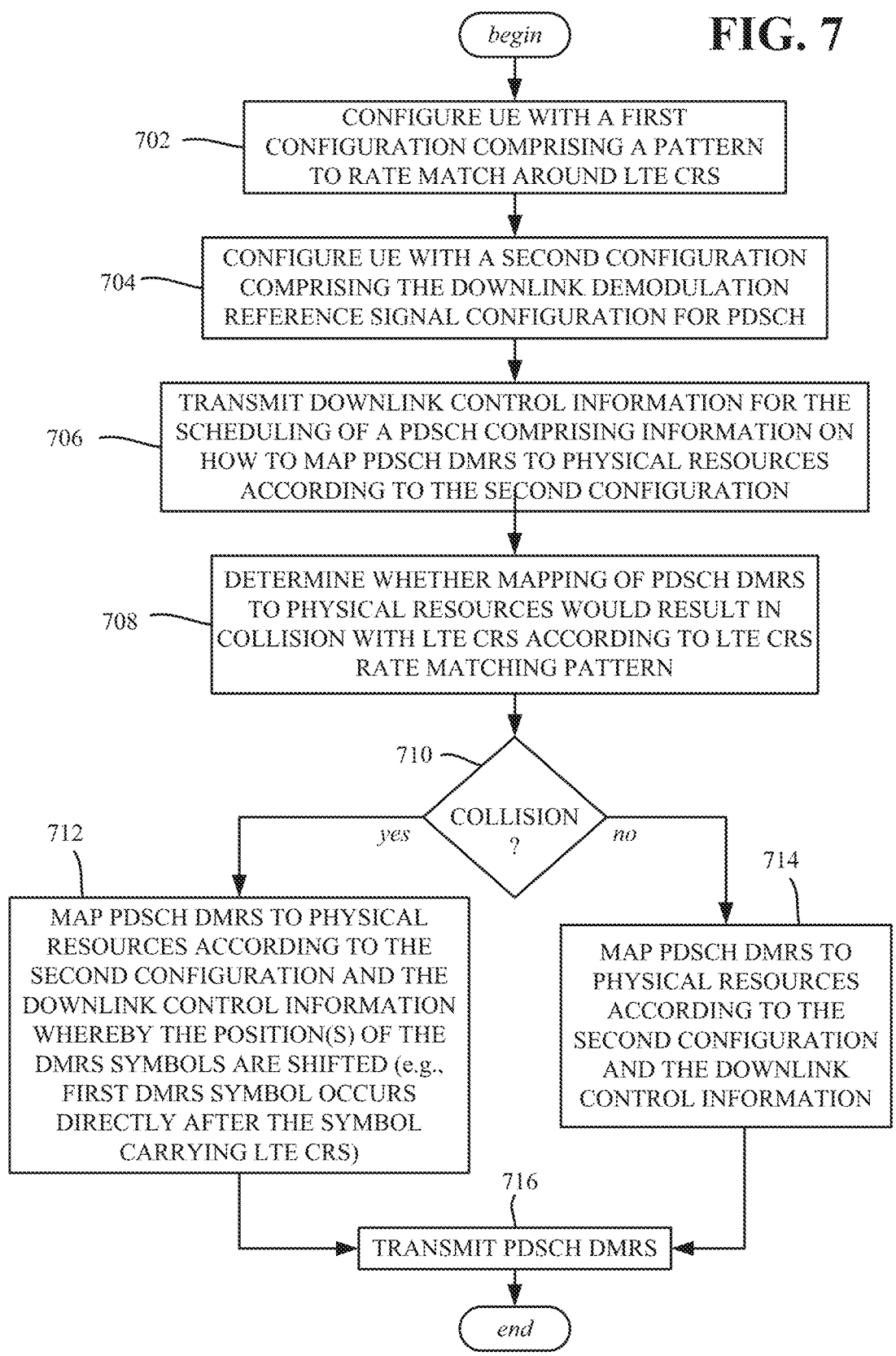
FIG. 7 is a flow diagram representing example operations related to dynamic shifting of demodulation reference signals contained in a PDSCH symbol, in accordance with various aspects and embodiments of the subject disclosure.

FIG. 7 is a flow diagram showing example operations of a network device such as the base station 210 of FIG. 2, beginning at operation 702 where the base station 210 transmits data to configure the UE (e.g., mobile station 211) with a first configuration comprising a pattern to rate match around LTE CRS. Operation 706 transmits data to configure the UE with a second configuration comprising the downlink demodulation reference signal configuration for PDSCH. Operation 706 transmits downlink control information for the scheduling of a PDSCH comprising information on how to map PDSCH DMRS to physical resources according to the second configuration.

Operation 708 represents determining whether mapping of PDSCH DMRS to physical resources would result in a collision with LTE CRS according to the LTE CRS rate matching pattern. If there would be a collision (operation 710), the process branches to operation 712 which performs the DMRS symbol shifting with respect to mapping PDSCH DMRS to physical resources according to the second configuration and the downlink control information. For example, the position(s) of the DMRS symbols can be incremented/shifted such that the first DMRS symbol occurs directly after the symbol carrying LTE CRS.

If there would not be a collision, then operation 714 represents the non-shifting situation, that is, maps PDSCH DMRS to physical resources according to the second configuration and the downlink control information without symbol shifting of the DMRS PDSCH.

Operation 716 transmits the PDSCH, including the PDSCH containing the DMRS.

Figure 8:
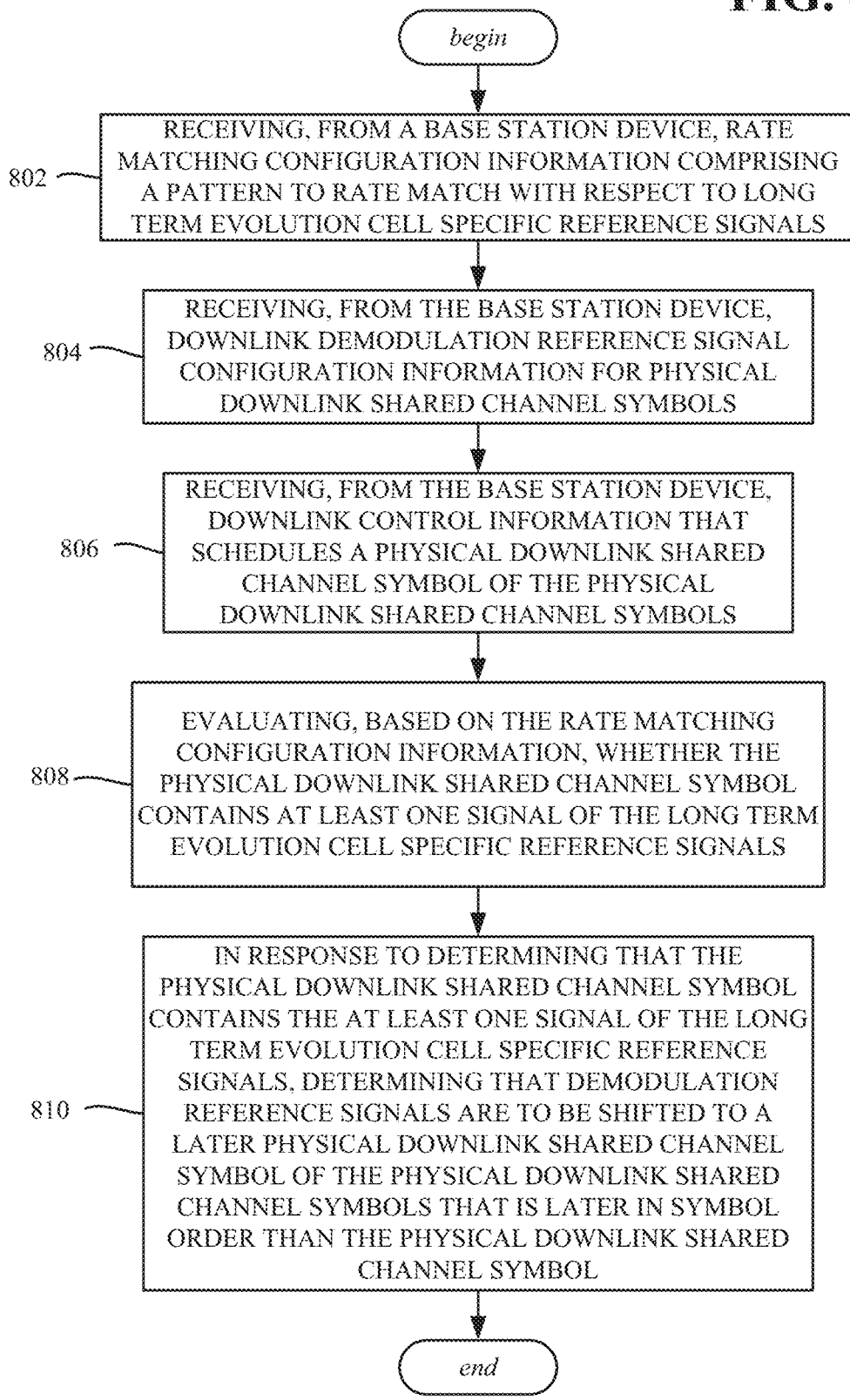
FIG. 8 illustrates example operations of a user equipment device to evaluate configuration information to determine whether demodulation reference signals contained in a PDSCH symbol have been shifted to a later PDSCH symbol, in accordance with various aspects and embodiments of the subject disclosure.

One or more example aspects are represented in FIG. 8, and can correspond to a user equipment device, comprising a processor, and a memory that stores executable instructions that, when executed by the processor, facilitate performance of operations. Example operation 802 represents receiving, from a base station device, rate matching configuration information comprising a pattern to rate match with respect to long term evolution cell specific reference signals. Example operation 804 represents receiving, from the base station device, downlink demodulation reference signal configuration information for physical downlink shared channel symbols. Example operation 806 represents receiving, from the base station device, downlink control information that schedules a physical downlink shared channel symbol of the physical downlink shared channel symbols. Example operation 808 represents evaluating, based on the rate matching configuration information, whether the physical downlink shared channel symbol contains at least one signal of the long term evolution cell specific reference signals. Example operation 810 represents, in response to determining that the physical downlink shared channel symbol contains the at least one signal of the long term evolution cell specific reference signals, determining that demodulation reference signals are to be shifted to a later physical downlink shared channel symbol of the physical downlink shared channel symbols that is later in symbol order than the physical downlink shared channel symbol.

The physical downlink shared channel symbol can be a first physical downlink shared channel symbol, and the later physical downlink shared channel symbol can be a second physical downlink shared channel symbol that is directly after the first physical downlink shared channel symbol.

Further operations can comprise mapping the demodulation reference signals to physical resources according to the downlink demodulation reference signal configuration information and the downlink control information.

Further operations can comprise, in response to determining that the physical downlink shared channel symbol does not contain the at least one signal of the long term evolution cell specific reference signals, determining that the demodulation reference signals are present in the physical downlink shared channel symbol.

Further operations can comprise mapping the demodulation reference signals to physical resources according to the downlink demodulation reference signal configuration information and the downlink control information.

The demodulation reference signals can be second demodulation reference signals, the physical downlink shared channel symbol can be a second physical downlink shared channel symbol, the later physical downlink shared channel symbol can be a third physical downlink shared channel symbol, and further operations can comprise determining from the rate matching configuration information that first demodulation reference signals are transmitted in a first physical downlink shared channel symbol that is different from the second physical downlink shared channel symbol and the third physical downlink shared channel symbol.

The third physical downlink shared channel symbol can be directly after the second physical downlink shared channel symbol.

The long term evolution cell specific reference signals can be first long term evolution cell specific reference signals, the demodulation reference signals can be first demodulation reference signals, the physical downlink shared channel symbol can be a first physical downlink shared channel symbol, the later physical downlink shared channel symbol can be a second physical downlink shared channel symbol, and further operations can comprise determining, from the rate matching configuration information, that second long term evolution cell specific reference signals are transmitted in a third physical downlink shared channel symbol, and that the second demodulation reference signals are shifted to a fourth physical downlink shared channel symbol.

The demodulation reference signals can be first demodulation reference signals, the physical downlink shared channel symbol can be a first physical downlink shared channel symbol, the later physical downlink shared channel symbol can be a second physical downlink shared channel symbol, and further operations can comprise, determining, from the rate matching configuration information, that second demodulation reference signals are transmitted in a third physical downlink shared channel symbol.

Figure 9:
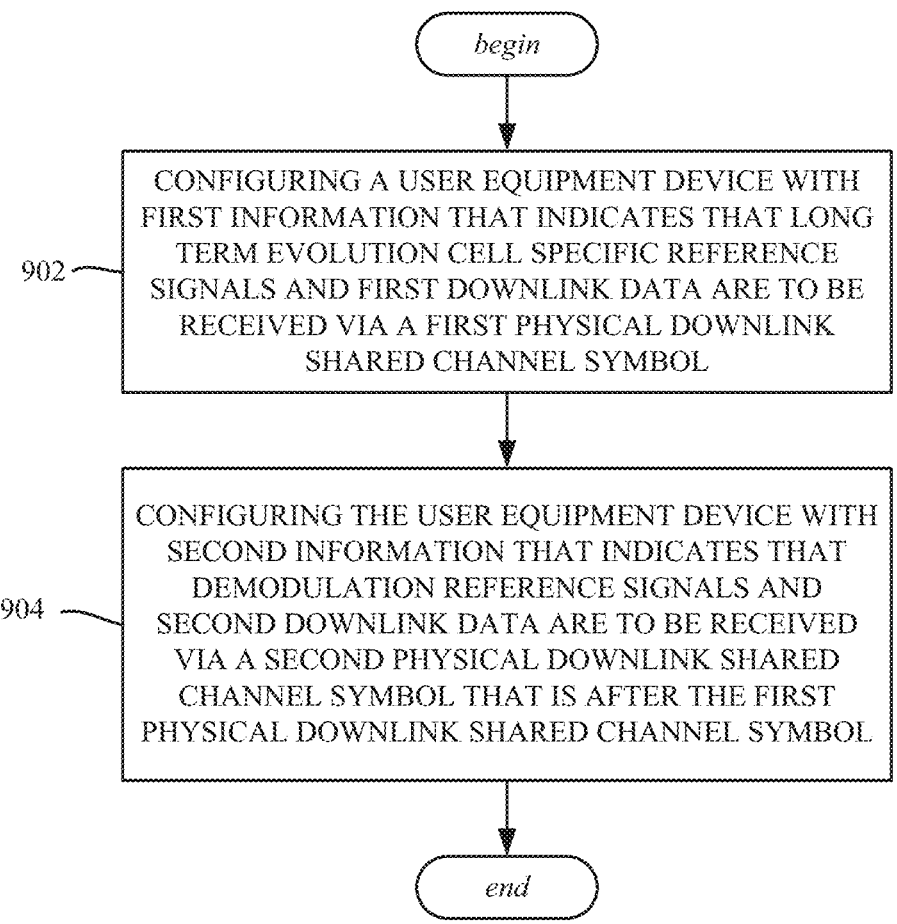
FIG. 9 illustrates example operations of a wireless network device to configure a user equipment with information that can be used to indicate that demodulation reference signals contained in a PDSCH symbol have been shifted to a later PDSCH symbol, in accordance with various aspects and embodiments of the subject disclosure.

One or more example aspects are represented in FIG. 9, and can correspond to a wireless network device, comprising a processor, and a memory that stores executable instructions that, when executed by the processor, facilitate performance of operations. Example operation 902 represents configuring a user equipment device with first information that indicates that long term evolution cell specific reference signals and first downlink data are to be received via a first physical downlink shared channel symbol. Operation 904 represents configuring the user equipment device with second information that indicates that demodulation reference signals and second downlink data are to be received via a second physical downlink shared channel symbol that is after the first physical downlink shared channel symbol.

Configuring the user equipment device with the second information can comprise semi-statically configuring the user equipment with data that indicates that the demodulation reference signals are to be received via the second symbol of a new radio physical downlink shared channel with physical downlink shared channel mapping type B.

The first information can comprise a pattern to rate match around long term evolution cell specific reference signals, the second information can comprise a downlink demodulation reference signal configuration for physical downlink shared channel mapping type B, and further operations can comprise, transmitting downlink control information for scheduling of a physical downlink shared channel symbol that contains the long term evolution cell specific reference signals and the first downlink data, and shifting the demodulation reference signals and second downlink data to the second physical downlink shared channel symbol that is after the first physical downlink shared channel symbol.

The second physical downlink shared channel symbol can be directly after the first physical downlink shared channel symbol.

The first information can comprise a pattern to rate match around long term evolution cell specific reference signals, the second information can comprise a downlink demodulation reference signal configuration for physical downlink shared channel mapping type B that indicates that two consecutive groups of demodulation reference signal are to be transmitted, and further operations can comprise, transmitting downlink control information for scheduling of a first physical downlink shared channel symbol that contains the long term evolution cell specific reference signals and the first downlink data, shifting a first group of the demodulation reference signals and second downlink data to the second physical downlink shared channel symbol that is after the first physical downlink shared channel symbol, and shifting a second group of demodulation reference signals and third downlink data to a third physical downlink shared channel symbol that is after the second physical downlink shared channel symbol.

The demodulation reference signals can be first demodulation reference signals, and the second information can further indicate that second demodulation reference signals are to be received via a third physical downlink shared channel symbol that is later than the first physical downlink shared channel symbol.

The demodulation reference signals can be second demodulation reference signals, and the second information can further indicate that first demodulation reference signals are to be received via a third physical downlink shared channel symbol that is before the first physical downlink shared channel symbol.

Figure 10:
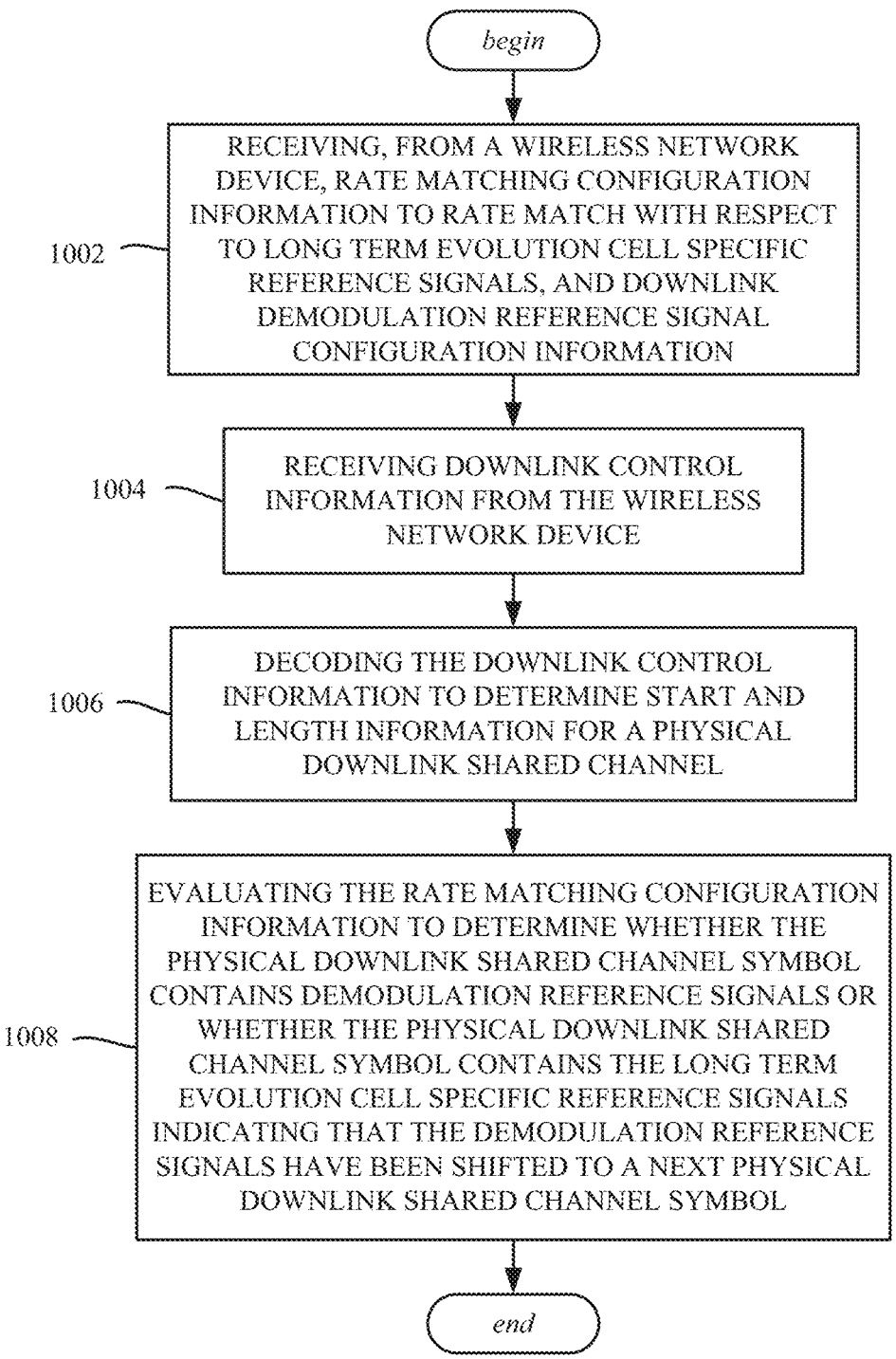
FIG. 10 illustrates example operations of a user equipment device to evaluate configuration information to determine whether demodulation reference signals contained in a PDSCH symbol are shifted to a later PDSCH symbol to avoid collision with LTE cell specific reference signals, in accordance with various aspects and embodiments of the subject disclosure.

One or more aspects, such as implemented in a machine-readable storage medium, comprising executable instructions that, when executed by a processor, facilitate performance of example operations, are represented in FIG. 10. Operation 1002 represents receiving, from a wireless network device, rate matching configuration information to rate match with respect to long term evolution cell specific reference signals, and downlink demodulation reference signal configuration information. Operation 1004 represents receiving downlink control information from the wireless network device. Operation 1006 represents decoding the downlink control information to determine start and length (e.g., one symbol) information for a physical downlink shared channel Operation 1008 represents evaluating the rate matching configuration information to determine whether the physical downlink shared channel symbol contains demodulation reference signals or whether the physical downlink shared channel symbol contains the long term evolution cell specific reference signals indicating that the demodulation reference signals have been shifted to a next physical downlink shared channel symbol.

Evaluating the rate matching configuration information further can comprise determining whether the wireless network device transmits other demodulation reference signals in another physical downlink shared channel symbol.

Evaluating the rate matching configuration information can determine that the physical downlink shared channel symbol contains the long term evolution cell specific reference signals in a first group of subcarriers of the physical downlink shared channel symbol; further operations can comprise obtaining downlink data from a second group of subcarriers of the physical downlink shared channel symbol.

The demodulation reference signals can be first demodulation reference signals, the downlink control information can be received via a single physical downlink control channel symbol, and can be the evaluating the rate matching configuration information further can comprise determining that a physical downlink shared channel symbol contains the first demodulation reference signals, that a second physical downlink shared channel after the first physical downlink shared channel symbol contains the long term evolution cell specific reference signals, and that a third physical downlink shared channel symbol after the second physical downlink shared channel symbol contains second demodulation reference signals.

As can be seen, the technology described herein facilitates the use of up to all NR OFDM symbols (except the first two of a slot), including when NR PDCCH is transmitted outside the first three OFDM symbols of a slot using NR PDSCH mapping type B, which provides increased spectral efficiency. Shifting of the NR DMRS can be dynamic, whereby NR DMRS need not be sent on the first OFDM symbol of the NR PDSCH resource allocation, such that the first PDSCH symbol can contain LTE CRS. More than one PDSCH symbol can contain NR DMRS, with shifting taking place to avoid LTE CRS collisions.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
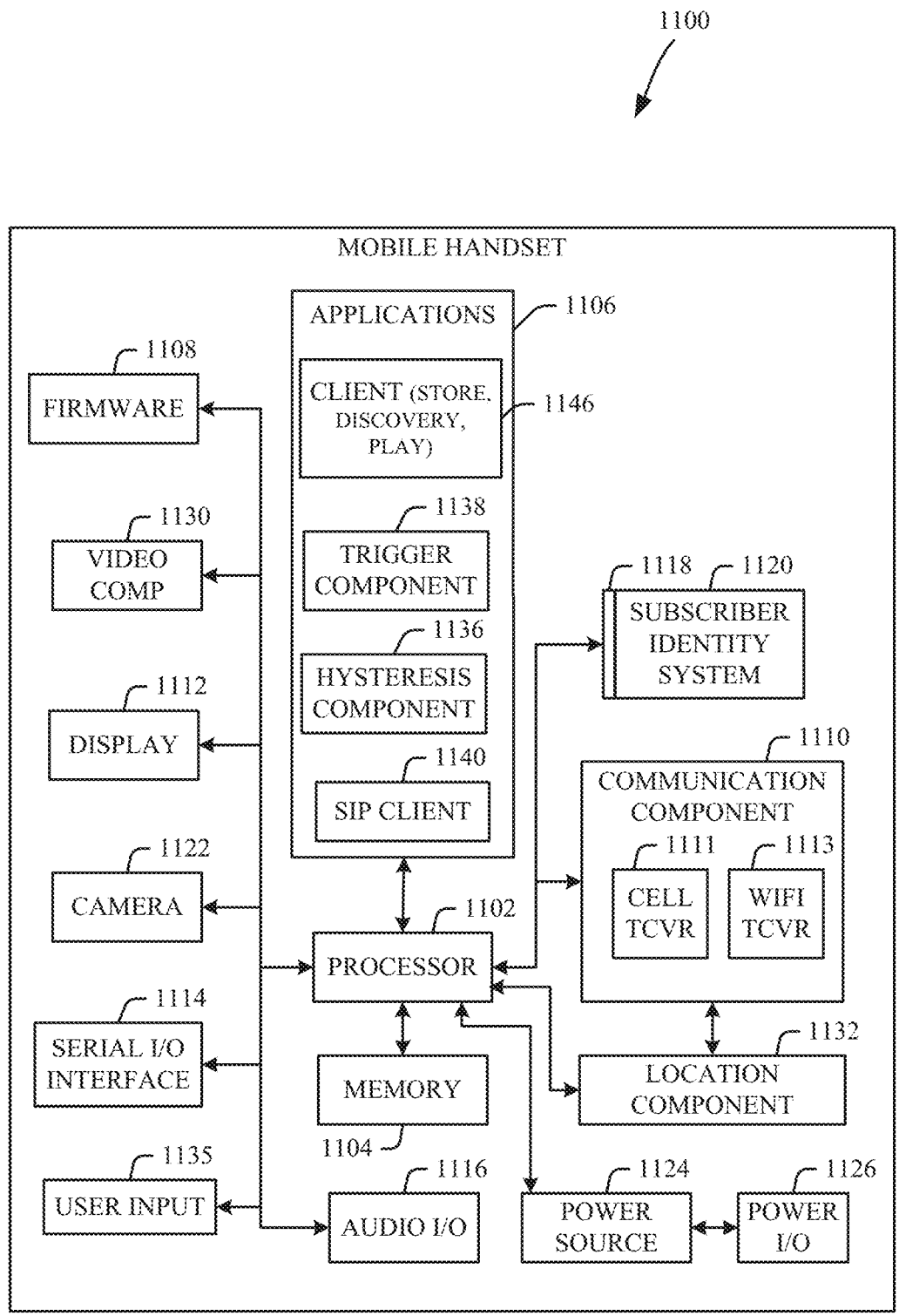
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
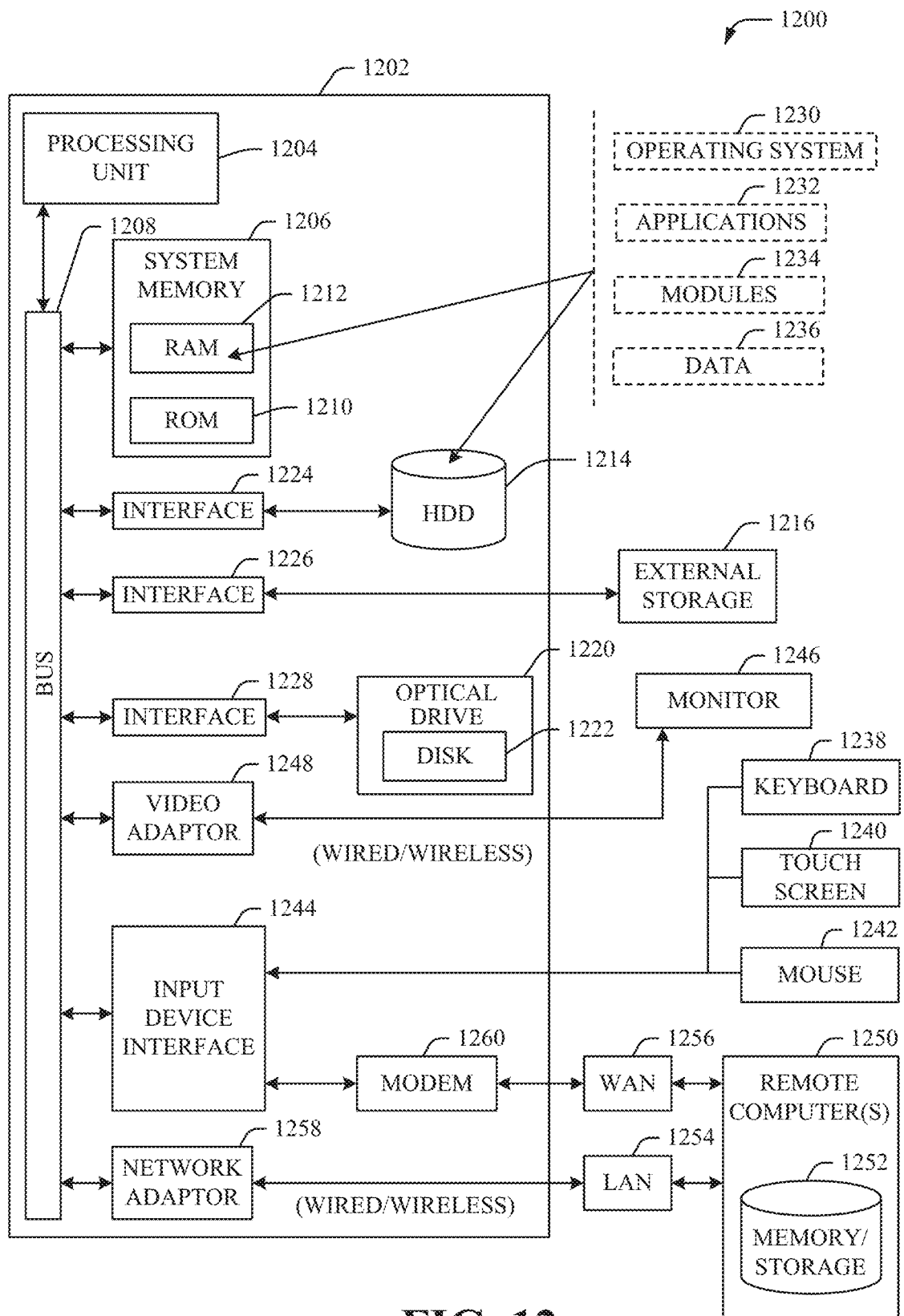
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown).

Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions that, when executed by the processor, facilitate performance of operations, the operations comprising:
   receiving, from a base station:
   rate matching configuration information comprising a pattern to rate match with respect to long term evolution cell specific reference signals,
   downlink demodulation reference signal configuration information for physical downlink shared channel symbols, and
   downlink control information that schedules a physical downlink shared channel symbol of the physical downlink shared channel symbols, wherein the long term evolution cell specific reference signals have a same subcarrier spacing as the physical downlink shared channel symbols; and
   in response to determining, based on the rate matching configuration information, that the physical downlink shared channel symbol contains a long term evolution cell specific reference signal of the long term evolution cell specific reference signals, and that the long term evolution cell specific reference signal is threshold likely to cause a collision with a first demodulation reference signal of a pair of demodulation reference signals configured for the physical downlink shared channel symbol and an adjacent physical downlink shared channel symbol that is subsequent, and adjacent, to the physical downlink shared channel symbol in a symbol order, determining that the pair of demodulation reference signals are to be shifted to a later pair of adjacent physical downlink shared channel symbols of the physical downlink shared channel symbols that is later in the symbol order than the physical downlink shared channel symbol, wherein the physical downlink shared channel symbol is a second physical downlink shared channel symbol, wherein the later pair of adjacent physical downlink shared channel symbols starts at a third physical downlink shared channel symbol, and wherein the third physical downlink shared channel symbol is directly after the second physical downlink shared channel symbol in the symbol order.

2. The user equipment of claim 1, wherein the operations further comprise mapping the pair of demodulation reference signals to physical resources according to the downlink demodulation reference signal configuration information and the downlink control information.

3. The user equipment of claim 1, wherein the operations further comprise, in response to determining that the physical downlink shared channel symbol does not contain the long term evolution cell specific reference signals, determining that a first demodulation reference signal of the pair of demodulation reference signals is present in the physical downlink shared channel symbol.

4. The user equipment of claim 3, wherein the operations further comprise mapping the pair of demodulation reference signals to physical resources according to the downlink demodulation reference signal configuration information and the downlink control information.

5. The user equipment of claim 1, wherein the physical downlink shared channel symbols are comprised within a slot.

6. The user equipment of claim 1, wherein the physical downlink shared channel symbols are part of a 14 symbol subframe.

7. The user equipment of claim 1, wherein the subcarrier spacing is 15 kilohertz.

8. A non-transitory machine-readable medium, comprising executable instructions that, when executed by a processor of a user equipment, facilitate performance of operations, the operations comprising:
  receiving, from network device:
    rate matching configuration information to rate match with respect to long term evolution cell specific reference signals,
    downlink demodulation reference signal configuration information for physical downlink shared channel symbols, and
    downlink control information that schedules a physical downlink shared channel symbol of the physical downlink shared channel symbols, wherein the long term evolution cell specific reference signals have a same subcarrier spacing as the physical downlink shared channel symbols; and
  in response to determining, based on the rate matching configuration information, that the physical downlink shared channel symbol contains a long term evolution cell specific reference signal of the long term evolution cell specific reference signals, and that the long term evolution cell specific reference signal would threshold likely cause a collision with a first demodulation reference signal of a pair of demodulation reference signals configured for the physical downlink shared channel symbol and an adjacent physical downlink shared channel symbol that is subsequent and adjacent to the physical downlink shared channel symbol in a symbol order, determining that the pair of demodulation reference signals are to be shifted to a later pair of adjacent physical downlink shared channel symbols of the physical downlink shared channel symbols that is later in the symbol order than the physical downlink shared channel symbol, wherein the physical downlink shared channel symbol is a second physical downlink shared channel symbol, wherein the later pair of adjacent physical downlink shared channel symbols starts at a third physical downlink shared channel symbol, and wherein the third physical downlink shared channel symbol is directly after the second physical downlink shared channel symbol in the symbol order.

9. The non-transitory machine-readable medium of claim 8, wherein the operations further comprise mapping the pair of demodulation reference signals to physical resources according to the downlink demodulation reference signal configuration information and the downlink control information.

10. The non-transitory machine-readable medium of claim 8, wherein the operations further comprise, in response to determining that the physical downlink shared channel symbol does not contain the at least one signal of the long term evolution cell specific reference signals, determining that a first demodulation reference signal of the pair of demodulation reference signals is present in the physical downlink shared channel symbol.

11. The non-transitory machine-readable medium of claim 10, wherein the operations further comprise mapping the pair of demodulation reference signals to physical resources according to the downlink demodulation reference signal configuration information and the downlink control information.

12. The non-transitory machine-readable medium of claim 8, wherein the physical downlink shared channel symbols are part of a 14 symbol subframe.

13. The non-transitory machine-readable medium of claim 8, wherein the subcarrier spacing is 15 kilohertz.

14. The non-transitory machine-readable medium of claim 8, wherein the physical downlink shared channel symbols are comprised within a slot.

15. A method, comprising:
  receiving, by a user equipment comprising a processor, from network equipment:
    rate matching configuration information to rate match with respect to long term evolution cell specific reference signals, and downlink demodulation reference signal configuration information, and
    downlink control information that schedules a physical downlink shared channel symbol of the physical downlink shared channel symbols, wherein the long term evolution cell specific reference signals have a same subcarrier spacing as the physical downlink shared channel symbols; and
  in response to determining, based on the rate matching configuration information, that the physical downlink shared channel symbol contains a long term evolution cell specific reference signal of the long term evolution cell specific reference signals, and that the long term evolution cell specific reference signal would cause a collision with a first demodulation reference signal of a pair of demodulation reference signals configured for the physical downlink shared channel symbol and an adjacent physical downlink shared channel symbol that is subsequent and adjacent to the physical downlink shared channel symbol in a symbol order, determining, by the user equipment, that the pair of demodulation reference signals are to be shifted to a later pair of adjacent physical downlink shared channel symbols of the physical downlink shared channel symbols that is later in the symbol order than the physical downlink shared channel symbol wherein the physical downlink shared channel symbol is a second physical downlink shared channel symbol, wherein the later pair of adjacent physical downlink shared channel symbols starts at a third physical downlink shared channel symbol, and wherein the third physical downlink shared channel symbol is directly after the second physical downlink shared channel symbol in the symbol order.

16. The method of claim 15, further comprising mapping, by the user equipment, the pair of demodulation reference signals to physical resources according to the downlink demodulation reference signal configuration information and the downlink control information.

17. The method of claim 15, further comprising, in response to determining that the physical downlink shared channel symbol does not contain the at least one signal of the long term evolution cell specific reference signals, determining, by the user equipment, that a first demodulation reference signal of the pair of demodulation reference signals is present in the physical downlink shared channel symbol.

18. The method of claim 15, wherein the physical downlink shared channel symbols are part of a 14 symbol subframe.

19. The method of claim 15, wherein the subcarrier spacing is 15 kilohertz.

20. The method of claim 15, wherein the physical downlink shared channel symbols are comprised within a slot.

* * * * *